P. WERTZ.
AUTOMOBILE SIGNAL.
APPLICATION FILED MAY 21, 1920.

1,356,896. Patented Oct. 26, 1920.

WITNESSES

INVENTOR
Peter Wertz
by Winter & Brown
his attorneys

UNITED STATES PATENT OFFICE.

PETER WERTZ, OF PITTSBURGH, PENNSYLVANIA.

AUTOMOBILE-SIGNAL.

1,356,896.  Specification of Letters Patent.  Patented Oct. 26, 1920.

Application filed May 21, 1920. Serial No. 383,112.

*To all whom it may concern:*

Be it known that I, PETER WERTZ, a resident of Pittsburgh, in the county of Allegheny and State of Pennsylvania, have invented a new and useful Improvement in Automobile-Signals, of which the following is a specification.

This invention relates to signals for automobiles. Particularly it relates to signals adapted to be mounted on the rear of vehicles, to indicate to other persons that the driver of the vehicle is about to stop or turn out of its previous course of travel.

Specifically, the invention comprises the provision of a lamp adapted to give signals at night, and a movable arm adapted to give signals in daylight. Particular means for operating the light and signal arm are provided as below described.

Figure 1:
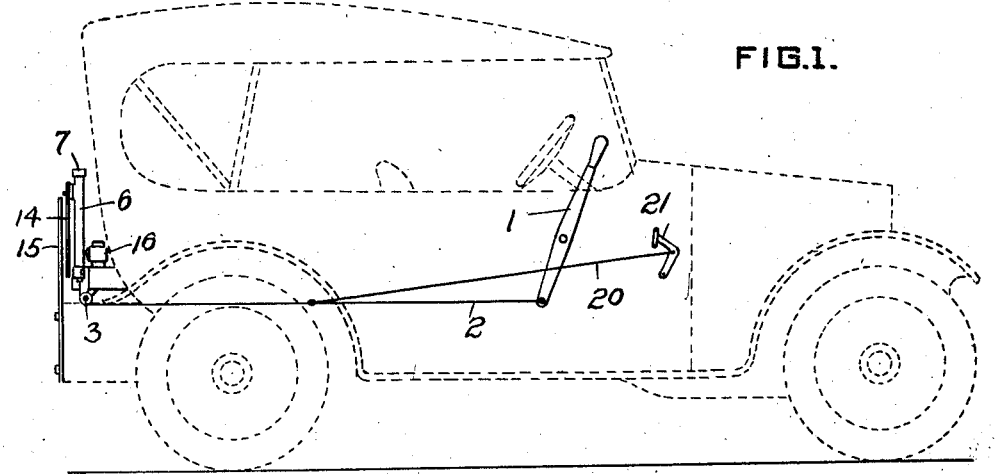
Figure 2:
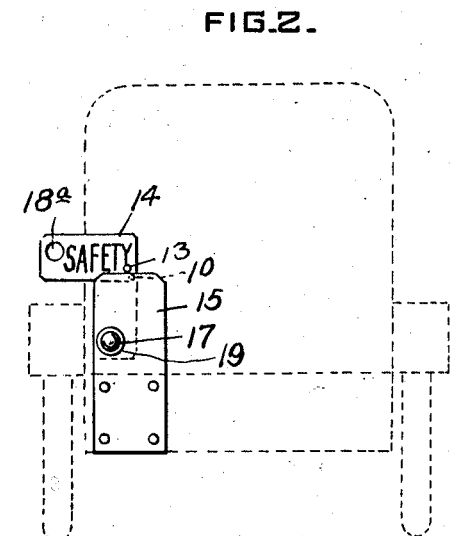
Figure 3:
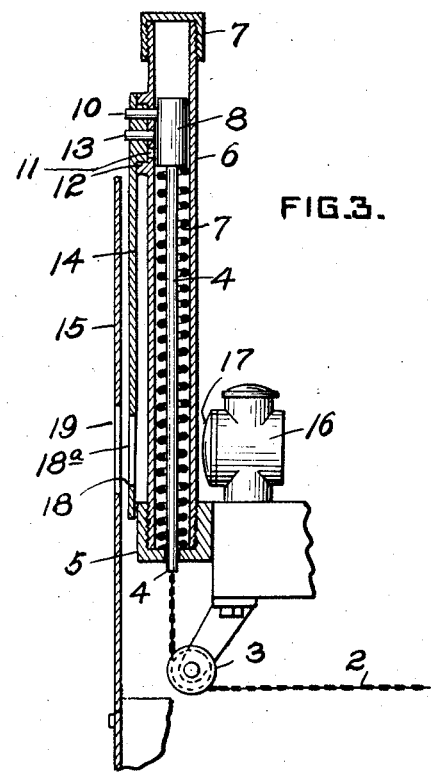
Figure 4:
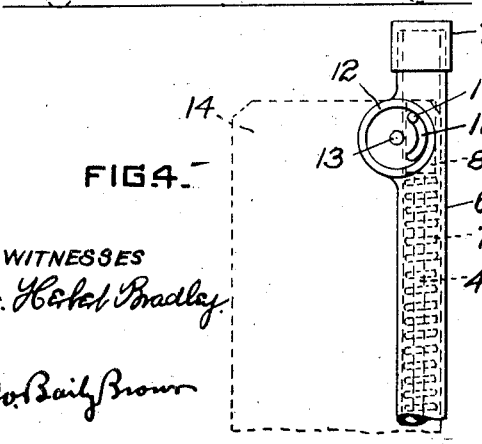

Referring to the drawings Figure 1 is a diagrammatic side elevation of an automobile showing the present invention applied thereto; Fig. 2 is a rear elevation of the same machine showing the safety arm in raised position; Fig. 3 is an enlarged vertical section through the portion of the operating mechanism for signaling; and Fig. 4 is a partial vertical section at right angles to that shown in Fig. 3.

The ordinary automobile carries a red light on the rear to show the position of the vehicle at night. During the day time there is no particular signaling device provided. It is customary for the driver to indicate a change of his course by extending his hand from the side of the vehicle. The present invention is adapted to provide an additional signal light for use in the dark, and to provide a mechanical arm, more positive in its action, and more easily perceptible from the rear, than the driver's hand, for use in the day.

In Fig. 1, a hand lever 1 is shown, diagrammatically applied to the ordinary automobile body. This lever is fulcrumed at some intermediate point, and the lower end is attached to a wire, or chain, 2, which extends to the rear of the vehicle, passing around an idle roller 3, carried by the vehicle body, and is attached to the lower end of a vertically disposed plunger member 4, the lower end of which extends through an opening in the bottom of a supporting member 5, which is rigidly attached to the automobile body, as shown. A tubular casing member 6 is adapted to be mounted in the supporting member 5, and is closed at the top by threaded cap 7. The member 4, which is in effect a plunger, is surrounded by coil spring 7, the lower end of which seats on the top of the supporting member 5, and the upper end of which bears against a shoulder formed by a head 8 fixed to the member 4. A pin 10 is fixed in the head 8, and extends through an arcuate slot 11 in a disk 12, which is fastened rigidly to the wall of the tube 6. A pin 13 is fixed in the disk 12, and the wall of the tube 6, and furnishes a bearing for a signal vane 14, which is rotatably mounted on the pin 13. The pin 10 extends loosely through a hole in this vane, and functions as below described. A screen 15 is mounted in front of the tube 6, and is adapted to hide from view the greater part of the tube, and to cover the vane 14, when that member is in vertical position. A signal light 16 is mounted on the vehicle body behind the vane 14 and screen 15. In place of the ordinary red lens, a yellow lens 17 is used. An opening 18 in the vane, and an opening 19 in the screen are situated just in front of the signal lens 17, and are adapted to transmit light from the signal lamp. The opening 18 in the vane carries a red lens 18$^a$. On the rear side of the vane 14 some such word as "Safety" is painted, in striking colors, so as to be readily observed by any person looking at the vehicle from the rear.

The chain 2 has an extension 20 extending to the foot brake 21 so that the signal apparatus will be operated when that pedal is depressed, as well as when the lever 1 is pulled back.

The operation of the device is as follows:

When the driver of a car wishes to signal that he is going to stop or turn, or when he does actually put on his brake to stop, the cable 2 will be pulled forward, depressing the plunger 4. The pin 10 being pulled down will move the vane 14, upon its pivotal mounting 13, the pin 10 moving around in the arcuate slot 11, as it goes down. This will throw the vane from a vertical position to a horizontal position, as shown in Fig. 2. The word Safety thereon will be apparent to persons looking from the rear in daylight, and will warn them that the vehicle is about to turn or to stop.

The lamp 16 when the vane 14 is in normal position, as shown in Fig. 3, will show red, as is customary with tail lights of automobiles. When the signal vane is raised to horizontal position as shown in Fig. 2, the red lens 18ᵃ will have been removed, and the lens 17 will be the only one screening the light, therefore the tail light will change from red to yellow, thus indicating to persons observing from the rear that the vehicle is about to stop or turn. Or the lenses may be placed in reverse relation from that described, if desired.

Or, if preferred, the ordinary tail light may be used on the car, and this signaling apparatus above described may be used in addition to the constant red signal. In that case the lens 17 may be yellow and the lens 18 red, as above described, resulting in a change of one of the tail lights from red to yellow, when a signal is to be given. Or, the vane may be made solid, thus entirely obscuring the light 16, and bringing into view an additional red light when the signal vane is raised.

The device is simple, economical, and may be attached to any car with small expense. It is positive in operation, and is designed to render driving in crowded traffic, and under modern conditions more safe. The many uses and advantages of the device will be apparent to those familiar with the art.

I claim:

1. A signaling device for automobiles comprising a screen, a signal vane normally hidden by the screen, a plunger attached to the vane said plunger being adapted to move said vane to horizontal position when the plunger is actuated, and means to depress the plunger.

2. A signaling device for automobiles comprising a screen, a signaling vane normally behind said screen, a pivot pin carrying the vane, a second pin attached to the vane, and means to depress the second pin in order to turn the vane on the first pin as a pivot and to bring the vane into horizontal position.

3. An automobile signaling device, comprising a screen having a hole therein, a signaling vane mounted behind the screen and having a hole therein normally registering with the hole in the screen, a red lens mounted in the hole in the vane, a yellow signaling light in line with the holes in the vane and screen, and means operable from the driver's seat of the vehicle to raise the vane to horizontal position, and to uncover the yellow lens of the signal light.

4. An automobile signaling device, comprising a screen having a hole therein, a signaling vane mounted behind the screen and having a hole therein normally registering with the hole in the screen, a yellow lens mounted in the hole in the vane, a red signaling light in line with the holes in the vane and screen, and means operable from the driver's seat of the vehicle to raise the vane to horizontal position, and to uncover the red lens of the signal light.

5. In a signaling device for automobiles, a tube adapted to be mounted on the rear of the car body, a chain extending to the front of the car, a plunger situated in the tube and attached to the said chain, a spring normally holding the plunger in raised position, a pin fixed in the head of the plunger, a signaling vane pivoted on the outside of the tube and having a hole therein engaging the pin fixed in the plunger, and means controllable by the driver of the car to actuate the chain and plunger mechanism to move the signaling vane from vertical to horizontal position.

In testimony whereof, I have hereunto set my hand.

PETER WERTZ

Witness:
 HOWARD F. SNIVELY.